United States Patent [19]

Maeda et al.

[11] Patent Number: 4,517,608
[45] Date of Patent: May 14, 1985

[54] IMAGE RECORDING DEVICE

[75] Inventors: Kiyoshi Maeda, Takatsuki; Masashi Okamoto, Kobe, both of Japan

[73] Assignee: Dainippon Screen Manufacturing Co., Ltd., Kyoto, Japan

[21] Appl. No.: 398,027

[22] Filed: Jul. 14, 1982

[30] Foreign Application Priority Data

Jul. 18, 1981 [JP] Japan ................ 56-112564

[51] Int. Cl.³ .............................. H04N 1/22
[52] U.S. Cl. .................... 358/298; 358/901; 346/108
[58] Field of Search ............... 358/256, 285, 286, 283, 358/901, 235, 200, 201, 199, 294; 332/7.51; 73/606–608, 609–612, 625; 346/107, 108; 350/96.1, 96.25; 250/234

[56] References Cited

U.S. PATENT DOCUMENTS 3,725,574  4/1973  Gast .................... 346/108
4,141,641  2/1979  Nagai .................. 358/901
4,164,717  8/1979  Blazey ................ 332/7.51

Primary Examiner—John C. Martin
Assistant Examiner—Edward L. Coles
Attorney, Agent, or Firm—Millen & White

[57] ABSTRACT

An image scanning and recording system includes a recording unit for duplicating and recording halftone images on a photosensitive material. The recording unit comprises an acousto-optic light modulating element including a plurality of ultrasonic wave exciting portions disposed side by side on a single acousto-optic medium. The ultrasonic wave exciting portions independently, modulate incident light into a plurality of modulated light beams in response to image signals from photoelectrical scanning means. A scale-down optical system then reduces the diameter of the plurality of modulated light beams, and a plurality of light transfer elements transfer the light beams from the scale-down optical system to a focussing lens system to be projected therefrom onto a film mounted on a recording cylinder.

7 Claims, 5 Drawing Figures

IMAGE RECORDING DEVICE

TECHNICAL FIELD

The present invention relates to an image recording device, and more particularly, it relates to the image recording device used in an image scanning and recording system for duplicating and recording halftone images on a photosensitive material in response to image signals from photoelectrical scanning means.

BACKGROUND ART

As examples of such image recording devices, one is known as disclosed, e.g. from Japanese Patent Publication No. 33523/1977, wherein a light beam in a light source is split into a plurality of light beams by a combination of half mirrors and mirrors, said light beams being then independently modulated in response to image signals from an original by an electro-optic light modulating element disposed correspondingly to the individual light beams, thereby recording halftone images. However, since such a device uses an electro-optical light modulating element, it is greatly influenced by ambient temperature variations, and, when actually used, requires a temperature control device, thus having the drawback of increasing the size of the device. Further, to effect perfect ON-OFF control of the individual light beams, it is necessary to apply a bias voltage to the electro-optic light modulating element, thus presenting drawbacks in regard to the circuit arrangement.

Further, it is essential for such device to use means for splitting a light beam from a light source into a plurality of light beams in advance.

As will be described in greater detail hereinafter, the present invention provides an image recording device which eliminates these disadvantages.

SUMMARY OF THE INVENTION

Accordingly, the present invention employs as light beam modulating means an acousto-optic light modulating element including a plurality of ultrasonic wave exciting portions arranged side by side on a single acousto-optic medium, thus providing for size reduction and stability. Further, where a plurality of light beams emitted from said light modulating element are allowed to fall upon a focusing lens system for forming rows of tiny light spots corresponding to the individual light beams on a photosensitive material to form halftone images, light beam transfer means such as optical fibers are interposed between the light modulating element and the focusing lens system, enabling the light source and light modulating element to be separated or spaced from the focusing lens system. Further, in order to efficiently introduce the individual light beams emitted from the light modulating element to the light beam transfer means, a scale-down optical system is disposed to precede said light beam transfer means, thereby further reducing the weight and size of the recording optical system.

DESCRIPTION OF THE PREFERRED EMBODIMENT

Figure 1:
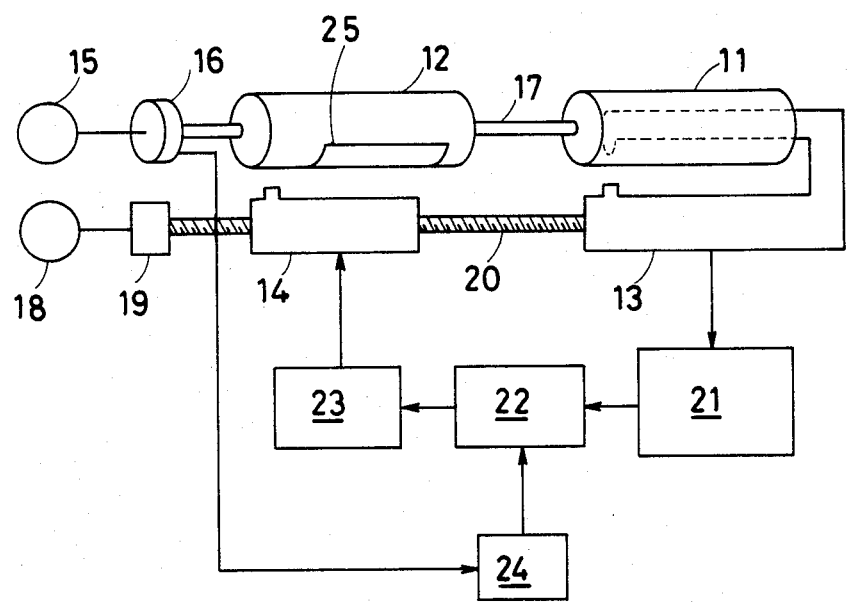
FIG. 1 is a schematic illustration of an image scanning and recording system used in the present invention.

FIG. 1 shows an image scanning and recording system applied to a color scanner. At the same time as an original cylinder 11 connected to the shaft 17 of a recording cylinder 12 is rotated at a suitable speed together with the recording cylinder 12, a feed screw 20 is rotated by a motor 18 through a speed reducer 19, so that a recording head 14 and a scanning head 13 are fed at a suitable speed axially with respect to the cylinders, and the scanning head 13 photoelectrically scans an original mounted on the original cylinder 11, thereby providing image signals. The image signals are fed as electric, color separation signals into a color arithmetic circuit 21, in which, as in the usual color scanner, they are subjected to color compensation and gradation compensation for adaptation to printing. The compensated image signals are then fed into a dot forming circuit 22. The dot forming circuit 22 connected to a pulse generator 24 producing timing signals in synchronous fashion with the rotary encoder 16, forms halftone forming signals in response to signals from the rotary encoder 16 and to said image signals. The halftone forming signals are transferred to the recording head 14 through a drive circuit 23, controlling the individual light beams emitted from the recoring head 14, whereby halftone images are recorded on the film 25 on the recording cylinder 12. In addition, the arrangement of the color scanner shown in FIG. 1 has been considerably simplified for convenience of description, but the device according to the invention is not limited in application to such arrangement.

Figure 2:
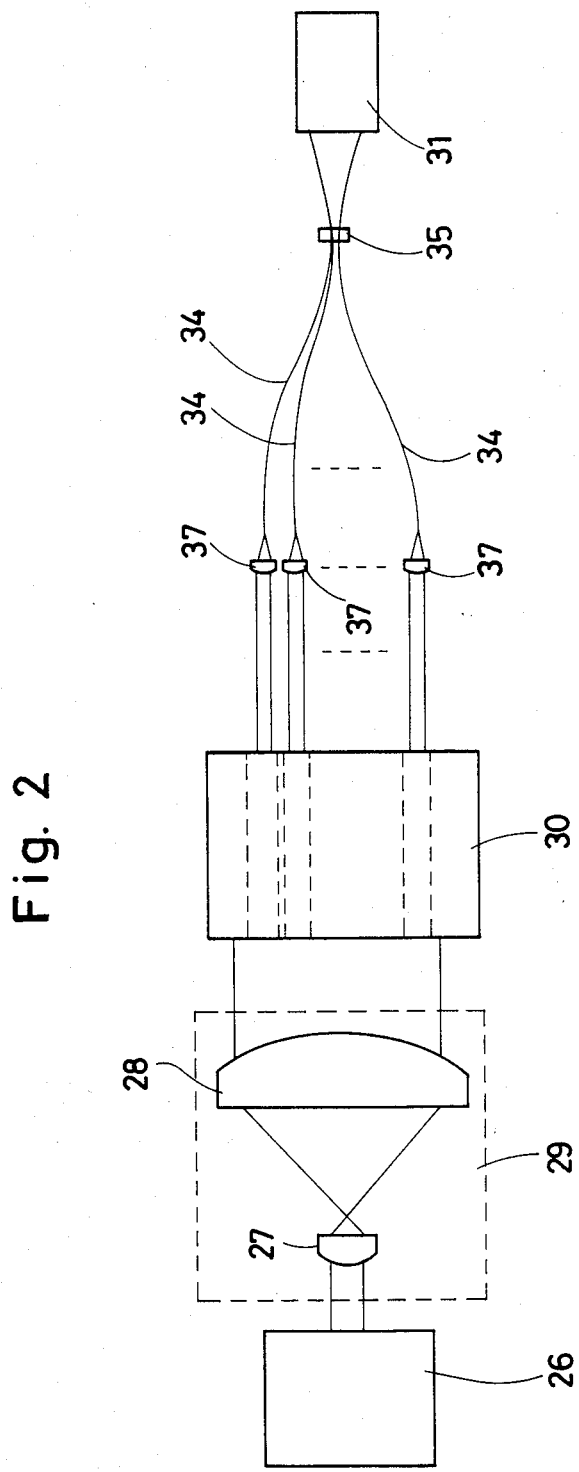
FIG. 2 is a block diagram of one embodiment of the device of the present invention.

FIG. 2 shows an image recording device according to an embodiment of the invention, wherein 26 denotes a light source such as a laser tube; 29 denotes a light beam flattener constituted by a pair of cylindrical lenses 27 and 28; 30 denotes an acousto-optic light modulating element; 34 denotes light beam transfer means; 35 denotes the output ends of these light beam transfer means 32; 37 denotes a scale-down optical system consisting of a plurality of tiny lenses associated with the modulated light beams from the light modulating element 30 and the light transfer means 34; and 31 denotes a focussing lens system for projecting in a predetermined scale-down ratio on the light beams from the output ends 35 of the light beam transfer means 34 on a film mounted on a recording cylinder (not shown).

Such an image recording device is contained in the recording head 14 shown in FIG. 1, and halftone forming signals produced in the dot forming circuit 22 are applied on the ultrasonic wave exciting portions of the acousto-optic light modulating element 30 through the drive circuit 23, and those light beams which fall upon the ultrasonic wave exciting portions are independently modulated and ON-OFF controlled.

Therefore, the light beam of substantially circular cross-section from the light source 26 falls upon the light beam flattener 29 constituted by a pair of cylindrical lenses 27 and 28 so arranged as to have a common focal axis and a common focal point, and it is converted into flat light beams fit to the light beam receiving surface of the subsequent acousto-optic light modulating element 30.

Figure 3:
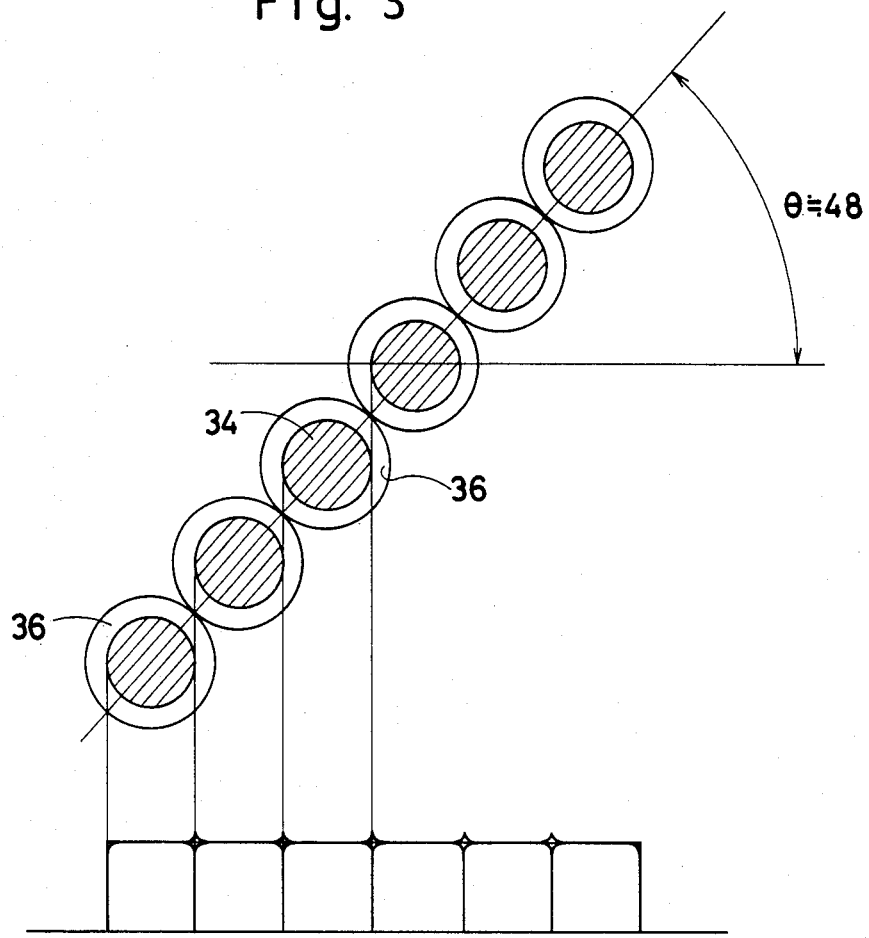
FIG. 3 is an enlarged cross-sectional view of the output ends of one form of the array of optical fiber bundles.
Figure 4:
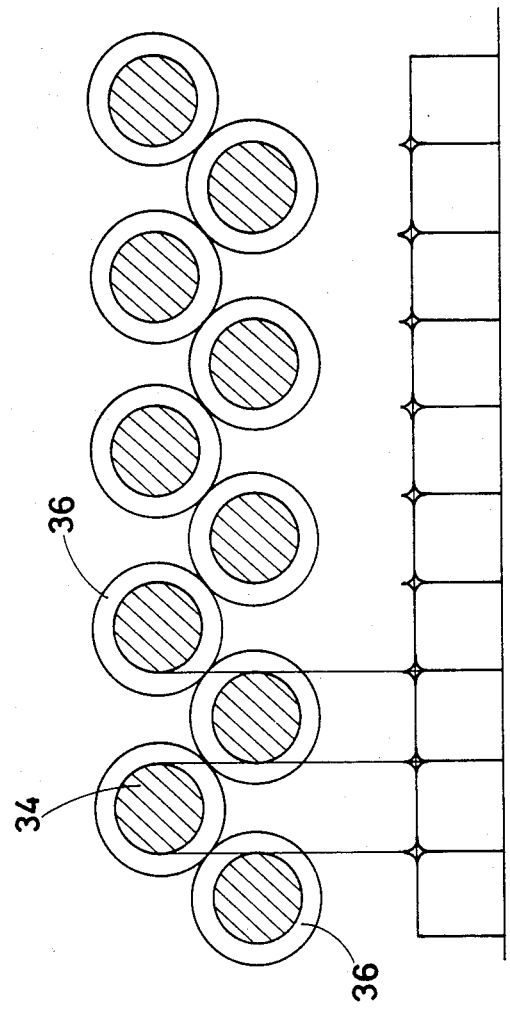
FIG. 4 is a similar view to FIG. 3 showing another form of the array of optical fiber bundles.

Of the flat light beams falling upon said light modulating element 30, those which fall upon the positions on the acousto-optic medium corresponding to the ultrasonic wave exciting portions are modulated by ultrasonic signals from the ultrasonic wave exciting portions traveling through the acousto-optic medium in response to halftone forming signals produced by the dot forming circuit 22 in FIG. 1, the modulated light beams being emitted from the light modulating element 30 as 1st and 0th order light in plural numbers. On the other hand, the light beams falling upon the positions on the acousto-optic medium not corresponding to the ultrasonic wave exciting portions just pass through the acousto-optic medium. In this case, therefore, only the 1st order light which is a plurality of light beams modulated in response to the dot forming signals is introduced into the light beam transfer means 34 by the corresponding scale-down optical systems 37, and the light beams emitted from the output ends 35 of said light beam transfer means 34 are projected in a predetermined scale-down ratio on the light sensitive material 25 on the recording cylinder 12 by the focusing lens system 31 to form rows of tiny light spots, thereby duplicating and recording halftone images. Since the modulated light beams are parallel, of course, the optical system 37 may be constituted by a pair of scale-down optical systems, as will be later described.

Where the output ends 35 of the light beam transfer means 34 are arranged in a row, they are arranged obliquely upwards, i.e., somewhat shifted in the sub-coordinate scanning direction, as shown in FIG. 3 to ensure that the distribution of light quantity in a row of tiny light spots is constant, and where they are arranged in two rows, they are arranged adjacent each other in zigzag fashion, as shown in FIG. 4, thereby making constant the distribution of light quantity. As can be seen in FIGS. 3 and 4, this is intended to prevent the influence of clads 36, which cover the optical fibers constituting the light beam transfer means 34, from extending to the distibution of light quantity.

Figure 5:
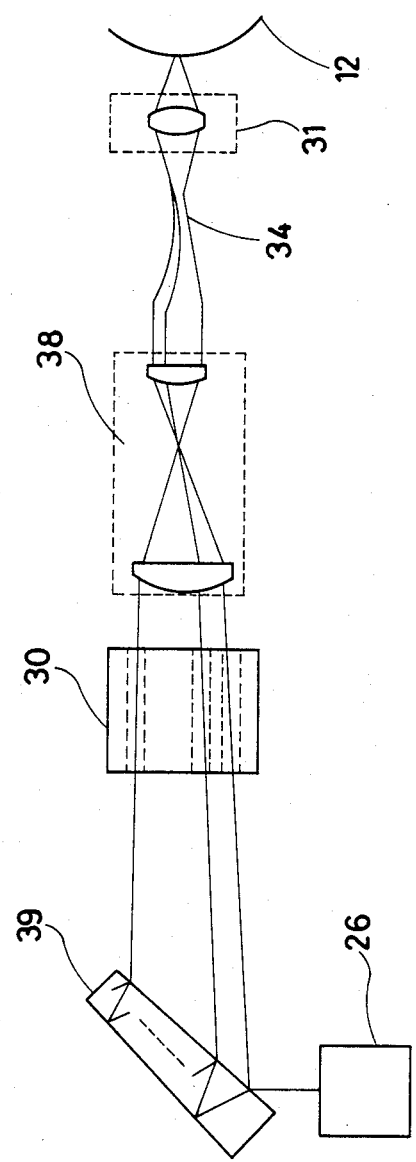
FIG. 5 is a block diagram of another embodiment of the image recording device according to the invention.

FIG. 5 shows an image recording device according to another embodiment of the invention. This embodiment differs from that shown in FIG. 2 in that the light beam from the light source 26 is split into a plurality of light beams by a light beam distributor 39 constituted by a light transmitting block defining a pair of flat surfaces opposed to each other in a wedge fashion, the resulting light beams falling upon the acousto-optic light modulating element 30, and in that when the light beams from the light modulating element 30 are introduced into the light beam transfer means 34, they are collectively introduced into the latter by a single scale-down optical system 38 of relatively large diameter consisting, e.g., of a pair of convex lenses. The use of the scale-down optical system 38 of relatively large diameter, as in this embodiment, saves the need of positioning a plurality of scale-down optical systems in alignment with the optical axes of the light beams from the light modulating element 30. Thus, this arrangement is very simple to produce and practical. Further, in this embodiment, in which a light beam splitter in wedge form is used as a light beam distributor, as described above, it is possible to replace for this light beam distributor a combination of half mirrors and mirrors used in the known devices, or a beam splitter constituted of parallel flat plates such as those disclosed in Japanese Patent Application Disclosure No. 118302/1977 and 123701/1977, or it is possible to use the light beam flattener 29 described in the embodiment shown in FIG. 2.

The device of this invention may afford the following advantages.

(1) A light beam is handled as a bundle of light, whereby the device can be reduced in size.

(2) Since the light source and the focusing lens system can be separated, the member for housing the focusing lens system, such as the recording optical system, can be reduced in size, and, moreover, the relative positions of the light source and focusing lens system can be optionally determined.

(3) The use of a plurality of light beam transfer means which are flexible allows the output ends thereof to be disposed adjacent each other, making it possible to optionally determine the arrangement of images of light spots.

(4) If the flexible light beam transfer means are in the form of optical fibers, the linear light beam row can be changed to a zigzag light beam row and the focusing lens system can be rotated. Further, since they are optical fibers, it is possible to prevent disturbance of light beams due to air flow and dust in the air.

(5) Since the output ends of optical fibers can be freely brought close to each other, the distribution of light quantity can be made uniform.

The above has been offered for illustrative purposes only, and it is not for the purpose of limiting the scope of this invention which is defined in the claims below.

We claim:

1. An image scanning and recording system having a recording unit for duplicating and recording halftone images on a photosensitive material, the system comprising:
    a beam flattener made up of a pair of cylindrical lenses for flattening a beam of light from a light source and transferring the flattened beam of light to an acousto-optic modulating element;
    an acousto-optic light modulating element having a plurality of ultrasonic wave exciting portions disposed side by side on a single acousto-optic medium for independently modulating incident light from the beam flattener with said ultrasonic wave exciting portions independently into a plurality of modulated light beams in response to image signals from a photo electrical scanning means;
    a scale down optical system for reducing the diameter of the plurality of modulated light beams from the acousto-optic light modulating element, said scale-down optical system comprising a plurality of small lenses of a size sufficient to reduce the diameter of each one of the modulated light beams; and
    a plurality of light transfer means corresponding in number to said plurality of small lenses for transferring the light beams from said scale-down optical system to a focussing lens system for projecting from the focussing lens system, in a predetermined scale-down ratio, the light beams from the output ends of the plurality of light transfer means onto a film mounted on a recording cylinder, and wherein said plurality of light transfer means comprises an optical fiber bundle.

2. The system as in claim 1, wherein the output ends of individual fibers of the optical fiber bundle are arranged in a row in closely adjoining relation along a line included to the subcoordinate scanning direction of the image scanning and recording system.

3. The system as in claim 1, wherein the output ends of individual fibers of the optical fiber bundle are arranged in a plurality of rows in closely adjoining relation parallel to the subcoordinate scanning direction of the image scanning and recording system, and the output ends in a row are alternately displaced in said direction relative to those in an adjacent row.

4. The system as in claim 1 further comprising a light source is a laser light source.

5. An image scanning and recording system having a recording unit for duplicating and recording halftone images on a photosensitive material, the system comprising:
   an acousto-optic light modulating element having a plurality of ultrasonic wave exciting portions disposed side by side on a single acousto-optic medium for independently modulating incident light with said ultrasonic wave exciting portions independently into a plurality of modulated light beams in response to image signals from a photo electrical scanning means;
   a scale down optical system for reducing the diameter of the plurality of modulated light beams from the acousto-optic light modulating element, said scale-down optical system comprising a plurality of small lenses of a size sufficient to reduce the diameter of each one of the modulated light beams; and
   a plurality of light transfer means corresponding in number to said plurality of small lenses for transferring the light beams from said scale down optical system to a focussing lens system for projecting from the focussing lens system, in a predetermined scale-down ratio, the light beams from the output ends of the plurality of light transfer means onto a film mounted on a recording cylinder, and wherein said plurality of light transfer means comprises an optical fiber bundle having the output ends of individual fibers of the optical fiber bundle arranged in a plurality of rows in closely adjoining relation parallel to the subcoordinate scanning direction of the image scanning and recording system, and the output ends in a row being alternately displaced in said direction relative to those in an adjacent row.

6. The system as in claim 5 further comprising a beam flattener made up of a pair of cylindrical lenses for flattening a beam of light from a light source and transferring the flattened beam of light to said acousto-optic modulating element.

7. The system as in claim 5 further comprising a light source which is a laser light source.

* * * * *